United States Patent
Nakagawa et al.

(10) Patent No.: US 7,337,113 B2
(45) Date of Patent: Feb. 26, 2008

(54) SPEECH RECOGNITION APPARATUS AND METHOD

(75) Inventors: Kenichiro Nakagawa, Tokyo (JP);
Hiroki Yamamoto, Kanagawa (JP);
Hideo Kuboyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 10/460,177

(22) Filed: Jun. 13, 2003

(65) Prior Publication Data

US 2004/0002867 A1   Jan. 1, 2004

(30) Foreign Application Priority Data

Jun. 28, 2002   (JP)   ............... 2002-190544

(51) Int. Cl.
G10L 15/20   (2006.01)
G10L 21/02   (2006.01)

(52) U.S. Cl. .................. 704/233; 704/226; 704/231

(58) Field of Classification Search ................ 704/226, 704/230, 231, 233, 270, 275
See application file for complete search history.

(56) References Cited

U.S. PATENT DOCUMENTS

| | | | | |
|---|---|---|---|---|
| 5,727,072 A | * | 3/1998 | Raman ............... | 381/94.2 |
| 5,749,068 A | * | 5/1998 | Suzuki ............... | 704/233 |
| 5,852,804 A | * | 12/1998 | Sako ............... | 704/275 |
| 5,924,065 A | * | 7/1999 | Eberman et al. ...... | 704/231 |
| 5,956,679 A | | 9/1999 | Komori et al. ...... | 704/256 |
| 6,381,569 B1 | * | 4/2002 | Sih et al. ............ | 704/233 |
| 6,393,396 B1 | * | 5/2002 | Nakagawa et al. ...... | 704/233 |
| 6,842,734 B2 | * | 1/2005 | Yamada et al. ...... | 704/245 |
| 2001/0001141 A1 | * | 5/2001 | Sih et al. ............ | 704/231 |
| 2003/0023432 A1 | * | 1/2003 | Kyomitsu ............ | 704/231 |
| 2003/0191636 A1 | * | 10/2003 | Zhou ............... | 704/226 |

FOREIGN PATENT DOCUMENTS

| | | |
|---|---|---|
| JP | 57-30913 (A) | 2/1982 |
| JP | 1-92699 (U) | 6/1989 |
| JP | 5-249989 (A) | 6/1993 |
| JP | 7-146698 (A) | 6/1995 |
| JP | 7146698 A * | 6/1995 |
| JP | 11-126092 | 5/1999 |
| JP | 2000-66697 (A) | 3/2000 |
| JP | 2002-182688 (A) | 6/2002 |
| JP | 3452443 (B) | 7/2003 |

* cited by examiner

Primary Examiner—Tālivaldis Ivars Šmits
Assistant Examiner—Douglas C Godbold
(74) Attorney, Agent, or Firm—Fitzpatrick, Cella, Harper & Scinto

(57) ABSTRACT

If an adaptation is made taking into consideration the noise produced in a specific operating mode of a device in a case where the noise environment changes, a decline in recognition rate is expected during operation of the device in a mode for which no adaptation is made. Accordingly, the present operating mode of the device is detected, the name of data for speech recognition corresponding to the operating mode of the device is retrieved from a table that describes data for speech recognition, the retrieved data for speech recognition corresponding to the operating mode of the device is set and speech recognition processing is executed based upon the set data.

12 Claims, 9 Drawing Sheets

FIG. 2

| OPERATING MODE | ACOUSTIC MODEL | POWER MODEL |
|---|---|---|
| FAX DATA TRANSMIT MODE | ACOUSTIC MODEL A | NOISE POWER A |
| FAX DATA RECEIVE MODE | ACOUSTIC MODEL B | NOISE POWER B |
| STANDBY MODE | ACOUSTIC MODEL C | NOISE POWER C |

FIG. 5

| OPERATING MODE | NOISE POWER SPECTRUM |
|---|---|
| TRAVELING AT 0 km/h | NOISE POWER SPECTRUM A |
| TRAVELING AT 0 to 20 km/h | NOISE POWER SPECTRUM B |
| TRAVELING AT 20 to 40 km/h | NOISE POWER SPECTRUM C |
| ⋮ | ⋮ |
| WIPERS OFF | NOISE POWER SPECTRUM X |
| WIPERS OPERATING (LOW SPEED) | NOISE POWER SPECTRUM Y |
| WIPERS OPERATION (HIGH SPEED) | NOISE POWER SPECTRUM Z |

FIG. 9

| OPERATING MODE | ACOUSTIC MODEL | NOISE POWER SPECTRUM |
|---|---|---|
| COPYING MODE | ACOUSTIC MODEL A | NOISE POWER SPECTRUM A |
| SORTER OPERATING MODE | ACOUSTIC MODEL B | NOISE POWER SPECTRUM B |
| STANDBY MODE | ACOUSTIC MODEL C | NOISE POWER SPECTRUM C |

SPEECH RECOGNITION APPARATUS AND METHOD

FIELD OF THE INVENTION

This invention relates to a speech recognition apparatus and method. More particularly, the invention relates to speech recognition processing that takes the operating sound of a device into consideration.

BACKGROUND OF THE INVENTION

Owing to advances in speech recognition technology and improvements in device capabilities, speech recognition is beginning to be introduced even in commonplace devices. Since control of device operation by voice does not require complicated manipulation, such control is helpful where children, the elderly or disabled are concerned. In addition, since an input device such as a keyboard is unnecessary, this contributes to a reduction in device size.

In general, speech recognition involves the occurrence of some recognition error. Noise that is input to a speech recognition apparatus simultaneously with the utterance of the user has a particularly serious effect upon speech recognition and it is therefore necessary to take ambient noise into account. The following noise countermeasures are often employed: (1) spectrum subtraction, which is a method wherein a spectrum obtained by subtracting a noise spectrum from an input speech spectrum is used in speech recognition, and (2) parallel model combination, which is a method wherein estimated noise is incorporated in an acoustic model beforehand and a decline in recognition rate is prevented in a noisy environment.

Further, there is a technique through which a decline in recognition rate is prevented by an approach different from that of speech recognition processing. For example, the specification of Japanese Patent Application Laid-Open No. 11-126092 discloses suppression of ambient noise as by closing windows and turning off music when speech recognition is carried out. Another approach is to notify the user of the present magnitude of ambient noise (the difficulty of speech recognition), thereby preventing needless utterances by the user.

Our surroundings include many devices that emit noise of their own. In order to operate such devices comfortably by voice, noise adaptation based upon the spectrum subtraction method or parallel model combination method is considered to be effective. However, there are instances where noise from a device changes greatly depending upon the operating mode of the device. For example, in the case of a facsimile machine, the noise produced at the time of data reception and the noise produced at the time of data transmission differ greatly from each other. If an adaptation is made taking into consideration the noise produced in a specific operating mode of a device in a case where the noise environment changes in this manner, a decline in recognition rate is expected during operation of the device in a mode for which no adaptation is made. Of course, though it is possible to make an adaptation using all of the noise produced in each of the operating modes, the results of the adaptation tend to be less than satisfactory.

SUMMARY OF THE INVENTION

Accordingly, an object of the present invention is to solve the above-mentioned problems individually or collectively and change over data for speech recognition in accordance with the operating mode of a device.

Another object of the present invention is to make data for speech recognition conform to a change in device operating sound with the passage of time.

According to the present invention, the foregoing object is attained by providing a speech recognition apparatus comprising: an input section arranged to input speech; a detector arranged to detect the present operating mode of a device; an instructor arranged to search a memory in which has been stored information indicating a corresponding relationship between the operating mode of the device and data for speech recognition, and to issue an instruction indicative of data for speech recognition, which has been retrieved from the memory, corresponding to the operating mode of the device; and a recognition section arranged to recognize the input speech using the data for speech recognition indicated by the instruction from the instructor.

Further, according to the present invention, the foregoing object is attained by providing the apparatus, further comprising: a sensor arranged to acquire the operating sound of the device; and an updater arranged to update the data for speech recognition, which has been indicated by the instruction from the instructor, based upon the operating noise of the device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram illustrating an example of a data description table for speech recognition data;

FIG. 5 is a diagram illustrating an example of descriptions in a data description table for speech recognition data in the first embodiment;

FIG. 9 is a diagram illustrating an example of descriptions in a data description table for speech recognition data in the second embodiment.

DETAILED DESCRIPTION OF THE PREFERRED EMBODIMENTS

An information processing apparatus for performing speech recognition according to an embodiment of the present invention will now be described in detail with reference to the drawings.

[Structure]

Figure 1:
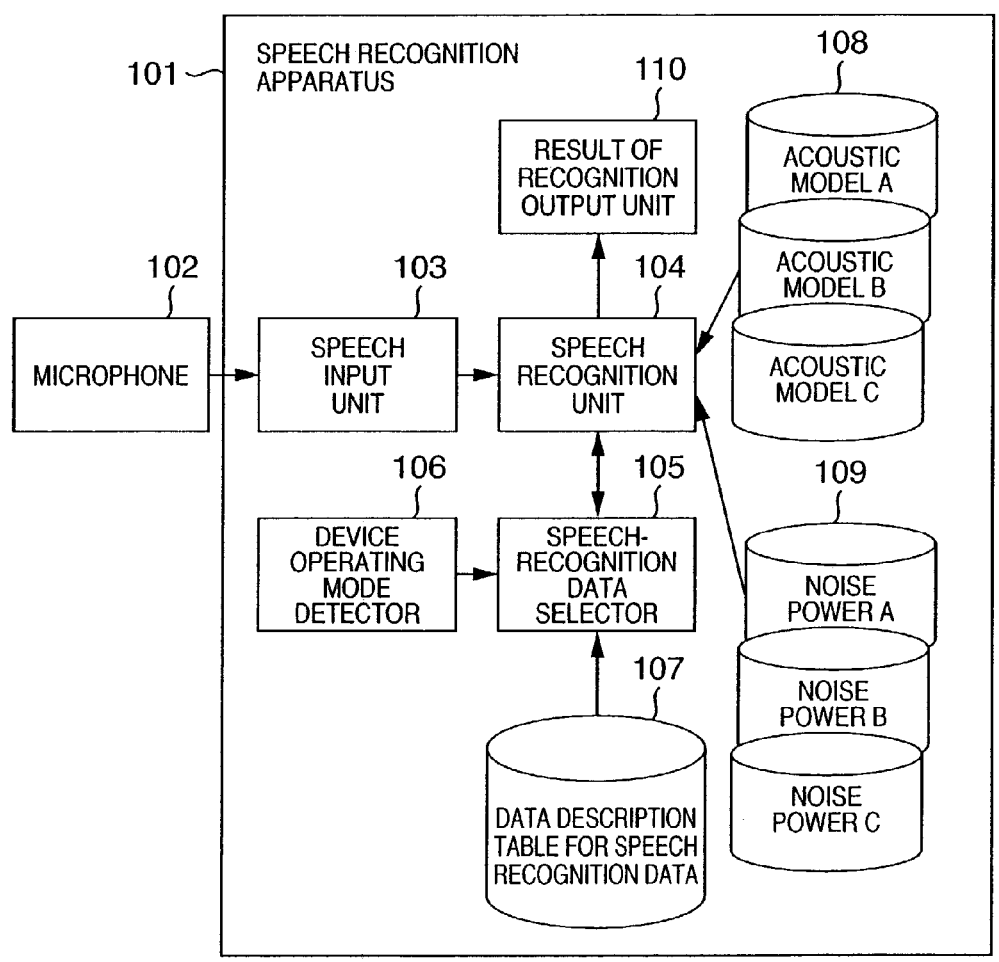
FIG. 1 is a block diagram illustrating the functional structure of a speech recognition apparatus.

FIG. 1 is a block diagram illustrating the functional structure of a speech recognition apparatus 101 according to an embodiment of the present invention. It should be noted that although the speech recognition apparatus 101 can also be constructed as a special-purpose apparatus, implementation is possible also by providing a personal computer with software for executing speech recognition.

A speech signal output from a microphone 102 that inputs speech is applied to a speech input unit 103. The speech input unit 103 converts the analog input speech signal to digital data, applies filter processing to the digital data and outputs the result to a speech recognition unit 104.

When a button or the like (not shown) for commanding start of speech recognition is pressed or a speech signal having a power greater than a certain value is input thereto, the speech recognition unit 104 starts speech recognition processing and requests a speech recognition data selector 105 for the name of data for speech recognition. In response to the request, the speech-recognition data selector 105 acquires information, which relates to the present operating mode of a device, from a device operating mode detector 106, acquires the name of the data for speech recognition that corresponds to this operating mode from a data description table 107 for speech recognition and supplies the speech recognition unit 104 with the acquired name of data for speech recognition.

On the basis of the acquired name of data for speech recognition, the speech recognition unit 104 acquires data, which is for speech recognition, comprising an acoustic model 108 and noise power 109, and recognizes the speech that is input by the microphone 102. The result of recognition is sent to a recognition-result output unit 110. The result of recognition is sent, via a prescribed interface, to a CPU that controls the device, and the signal is utilized as an operating command.

If the speech recognition apparatus 101 is installed in, e.g., a facsimile machine, the result of recognition is sent from the recognition-result output unit 110 to the controller of the facsimile machine. The controller interprets the result of recognition as an operating command and executes setting processing for registering an addressee, a series of processing operations for reading in an original image, dialing and performing facsimile transmission, and processing for printing an image that has been received in memory.

FIG. 2 is a diagram illustrating an example of the data description table 107 for speech recognition data. The table describes names of data for speech recognition corresponding to the operating modes of a device. In this example, the format of the table is such that the names of acoustic models and the names of noise powers are set forth in correspondence with respective ones of three operating modes of a facsimile machine, namely a standby mode, FAX data receive mode and FAX data transmit mode.

In general, each acoustic model 108 is a "Hidden Markov Model" (HMM) which is made by speech features. If, in a case where noise is assumed beforehand, a model is created using speech uttered in this noise environment, then it will be possible to prevent a decline in the recognition rate in this environment. Further, by combining an HMM of noise that has been created from several tens of seconds of noise with the HMM of clean speech, it is possible to approximate a speech model that includes the background noise that will prevail at the time of recognition.

Noise power 109 is information that indicates an estimated value of power (magnitude of sound) of speech produced in each operating mode. This information is used in speech detection (processing that separates input data into segments having speech and segments devoid of speech), which is processing that precedes speech recognition processing. For example, let N represent noise power and let Power(t) represent the power of input speech at a regular time interval. In such case it can be assumed that an utterance will be made at a time t that satisfies the equation below. By sending only this interval to the main processing of speech recognition, it will be possible to reduce the computation load.

$$\text{Power}(t) > a \times N$$

where a represents a constant that is equal to or greater than 1.

It should be noted that the data in the data description table 107 for speech recognition, acoustic model 108 and noise power 109 has been stored in a memory such as the hard disk of the speech recognition apparatus 101.

[Processing]

Figure 3:
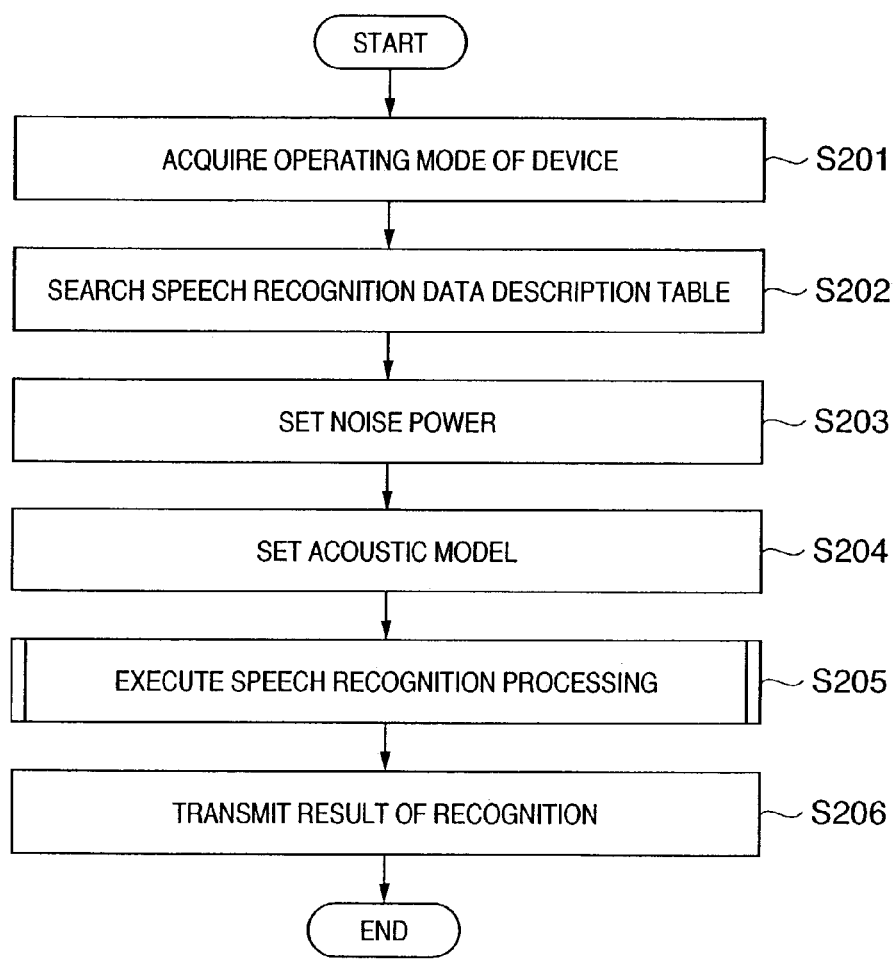
FIG. 3 is a flowchart for describing speech recognition processing.

FIG. 3 is a flowchart useful in describing speech recognition processing. This processing starts when the user presses a button indicated by "SPEECH" or when speech exhibiting power greater than a certain value is entered.

When speech recognition processing starts, the device operating mode detector 106 acquires the present operating mode of the device (S201). It will be assumed below that the present operating mode is the FAX data receive mode.

The speech-recognition data selector 105 searches the speech recognition data description table 107 using the present operating mode of the device, which has been acquired by the device operating mode detector 106, as a key (S202).

When the acoustic model name and noise power name corresponding to the operating mode are supplied thereto, the speech recognition unit 104 reads in the data from the acoustic model 108 and noise power 109 and initializes speech recognition processing using the data that has been read in (S203 and S204). In this example, acoustic model B and noise power B for the FAX data receive mode are read in.

Next, using the set data for speech recognition, the speech recognition unit 104 recognizes speech that enters from the microphone 102 via the speech input unit 103 (S205). Since this speech recognition processing employs well-known technology, the details thereof need not be described here. The result of speech recognition is sent to the recognition-result output unit 110 in order to be utilized as a device operating command (S206). Main processing ends at the moment the result of recognition is transmitted.

<First Embodiment>

Figure 4:
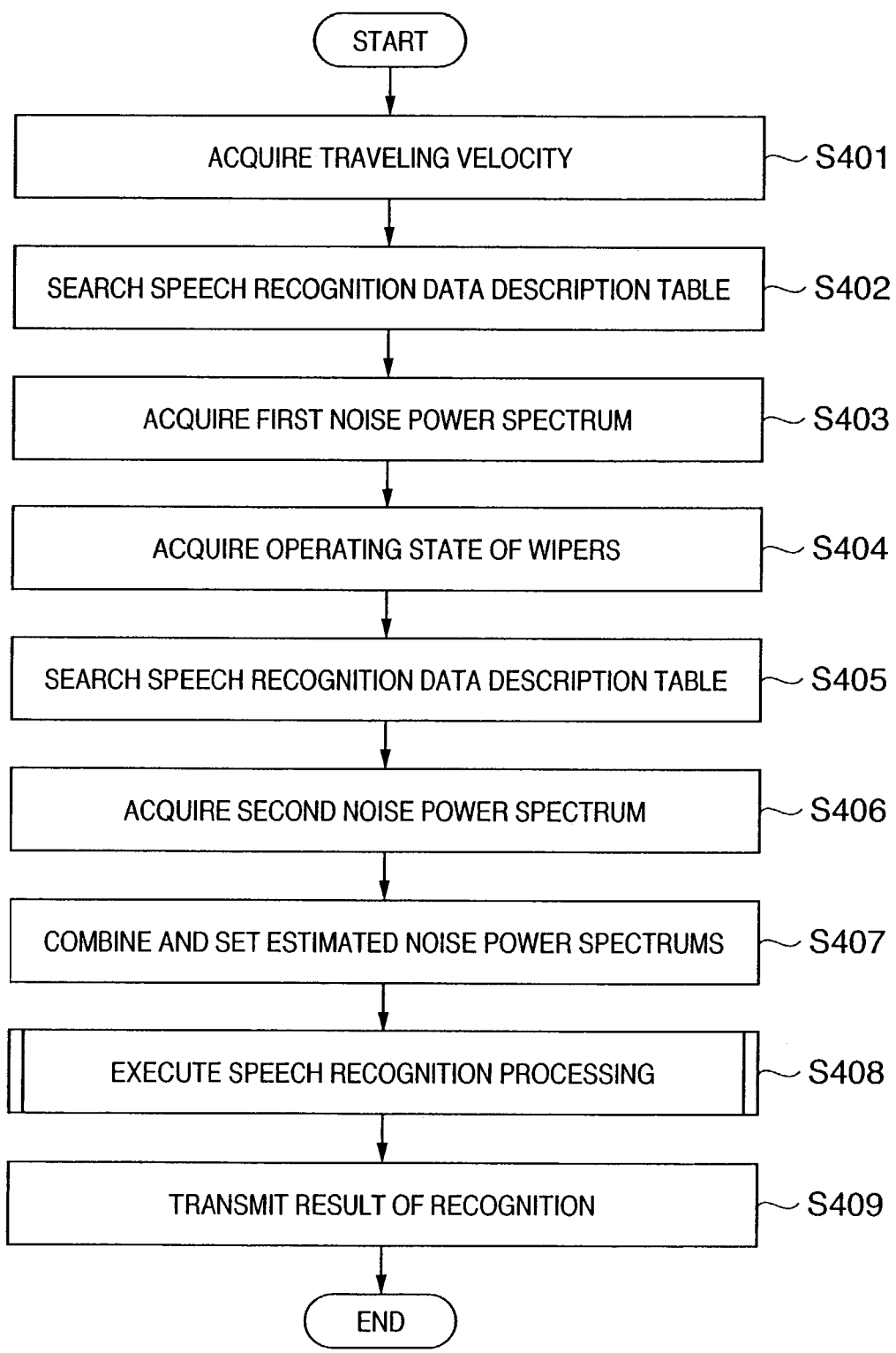
FIG. 4 is a flowchart illustrating processing in a case where a vehicle has been equipped with a speech recognition apparatus in a first embodiment of the invention.

FIG. 4 is a flowchart illustrating processing in a case where a vehicle has been equipped with the speech recognition apparatus of the invention. This processing is started when the driver of the vehicle presses a speech recognition start button provided on, e.g., the steering wheel of the vehicle.

First, the device operating mode detector 106 acquires the traveling velocity of the vehicle and applies a signal representing the acquired vehicle velocity to the speech-recognition data selector 105 (S401). The speech-recognition data selector 105 searches the speech recognition data description table 107, acquires the name of the data for speech recognition that corresponds to this traveling velocity and applies the acquired name of the speech recognition data to the speech recognition unit 104 (S402). The speech recognition unit 104 then acquires a noise power spectrum that corresponds to the name of the data for speech recognition (S403). The noise power spectrum acquired at this time shall be referred to as a "first noise power spectrum".

The noise power spectrum is data representing the intensity of every frequency component of noise. If the vehicle traveling velocity changes, then so does the power spectrum of the traveling vehicle sound (noise) as a matter of course. FIG. 5 is a diagram illustrating an example of descriptions in the data description table 107 for speech recognition data. Here the correspondence between traveling velocity and noise power spectrum is described using the traveling velocity as the operating mode. For example, if the traveling velocity is 10 km/h, then noise power spectrum B is selected as the first noise power spectrum.

Next, the device operating mode detector 106 acquires the operating state of the window wipers and applies a signal representing the acquired operating state (off, low speed or high speed) to the speech-recognition data selector 105 (S404). The speech-recognition data selector 105 searches the data description table 107 for speech recognition data, acquires the name of the data for speech recognition that corresponds to this operating state of the window wipers and applies the acquired name of the speech recognition data to the speech recognition unit 104 (S405). The speech recognition unit 104 then acquires a noise power spectrum that corresponds to the name of the data for speech recognition (S406). The noise power spectrum acquired at this time shall be referred to as a "second noise power spectrum".

Figure 6:
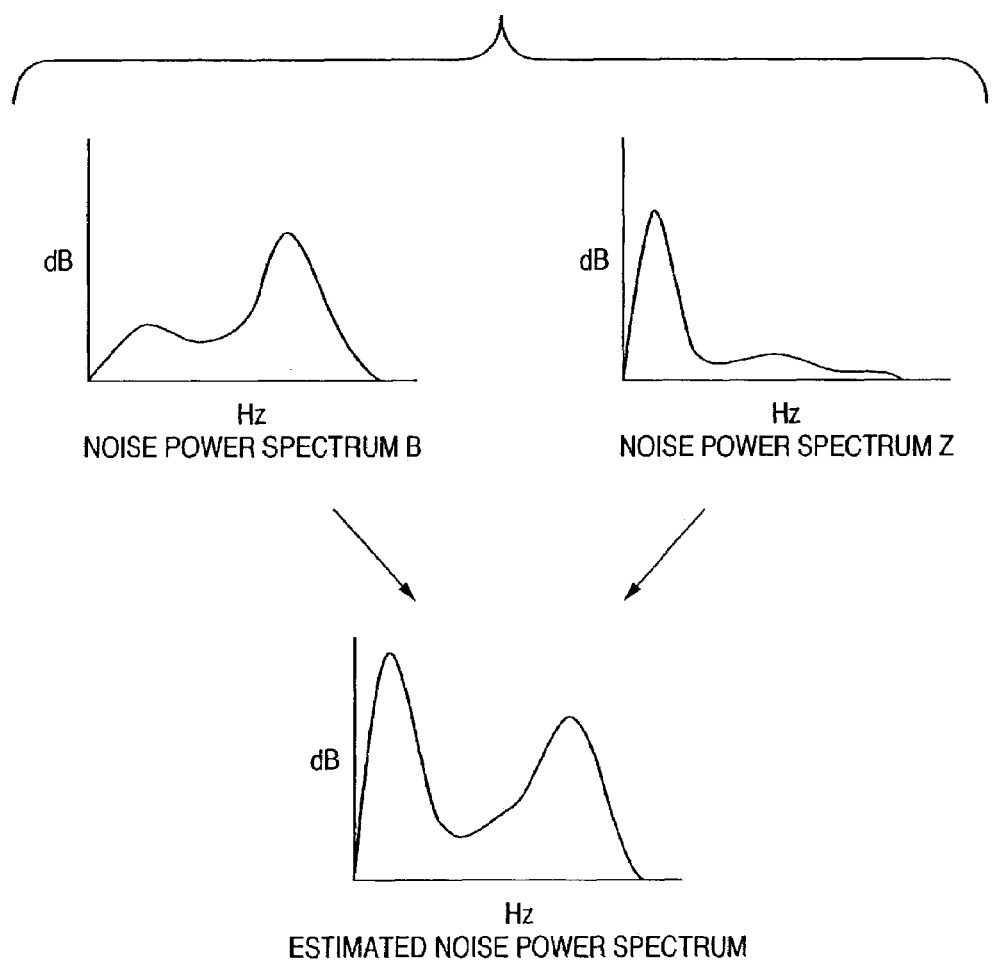
FIG. 6 is a diagram useful in describing combining of power spectrums in the first embodiment.

The speech recognition unit 104 combines the two acquired noise power spectrums and effects a conversion to an estimated noise power spectrum (S407). FIG. 6 is a diagram useful in describing the combining of power spectrums. It is possible to combine mutually non-interfering noise by adding the two spectrums together. As shown in FIG. 6, an estimated noise power spectrum can be obtained by adding together noise power spectrum B, which is observed at a traveling velocity of 10 km/h, and noise power spectrum Z, which is observed when the window wipers are operating at high speed.

The speech recognition unit 104 executes speech recognition processing, in which the estimated noise power spectrum that has been obtained is utilized in the spectrum subtraction method, and recognizes the speech of the driver input from the microphone 102 via the speech input unit 103 (S408). The speech recognition unit 104 sends the result of speech recognition to the recognition-result output unit 110 to utilize the result as a vehicle operating command (S409).

<Second Embodiment>

An example in which a copier has been equipped with the speech recognition apparatus of the invention will now be described. In the first embodiment, the speech recognition apparatus 101 changes over the noise power spectrum used in speech recognition in accordance with the operating mode of the vehicle. In the second embodiment, the apparatus has a function for updating the acoustic model and noise power spectrum at a prescribed timing. This is so that optimum noise processing will be executed in a case where the operating noise changes owing to aging that involves wear of parts, etc. The description that follows will focus on such noise adaptive processing.

Figure 7:
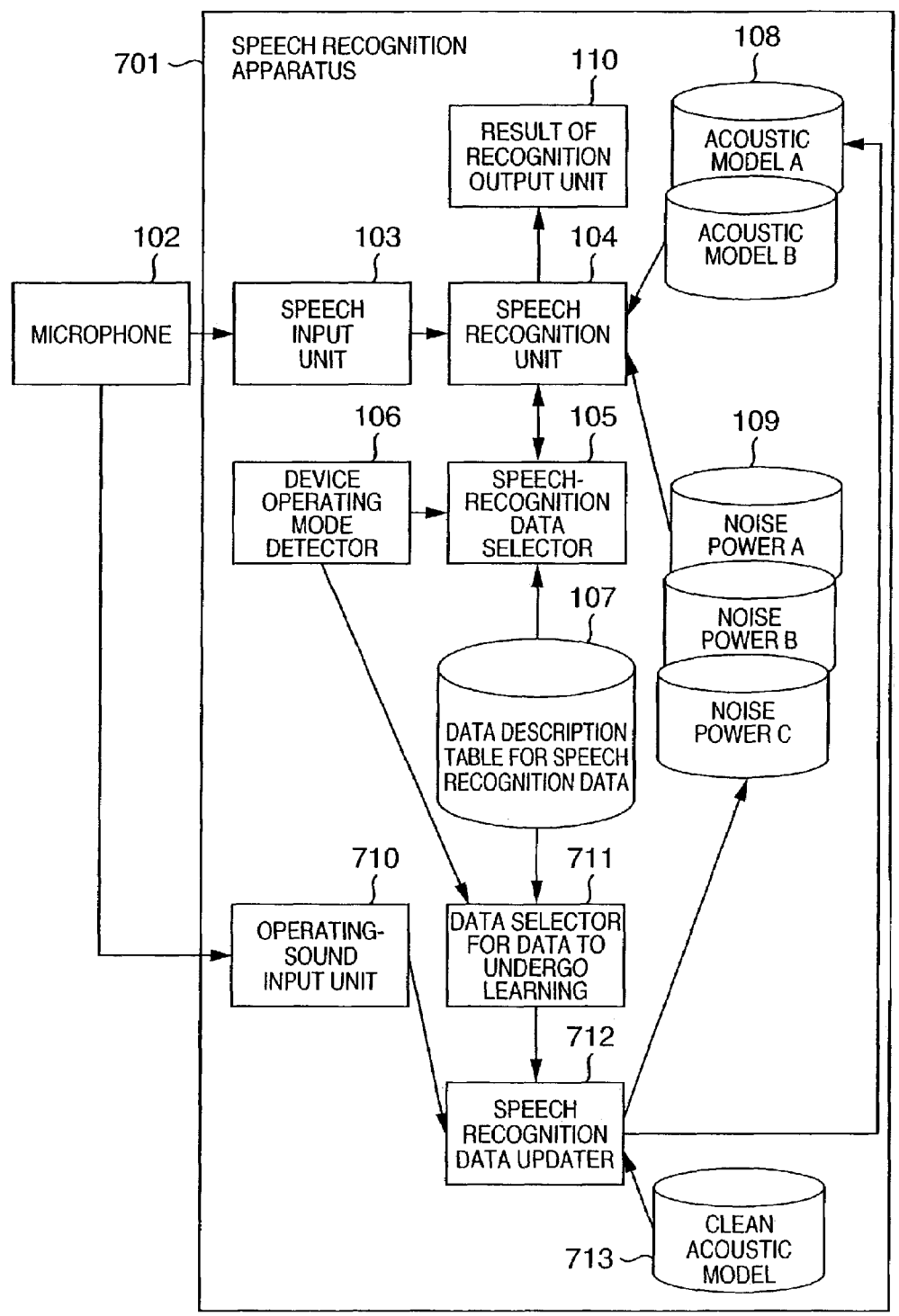
FIG. 7 is a block diagram illustrating the functional structure of a speech recognition apparatus in a second embodiment of the invention.

FIG. 7 is a block diagram illustrating the functional structure of a speech recognition apparatus 701 in a second embodiment of the invention. Components identical with those shown in FIG. 1 are designated by like reference characters and need not be described again.

The speech recognition apparatus 701 executes noise adaptive processing at a prescribed timing. This timing may be that at which the main power supply of the copier is turned on or when the copier has performed a prescribed operation (e.g., copying) a predetermined number of times.

Figure 8:
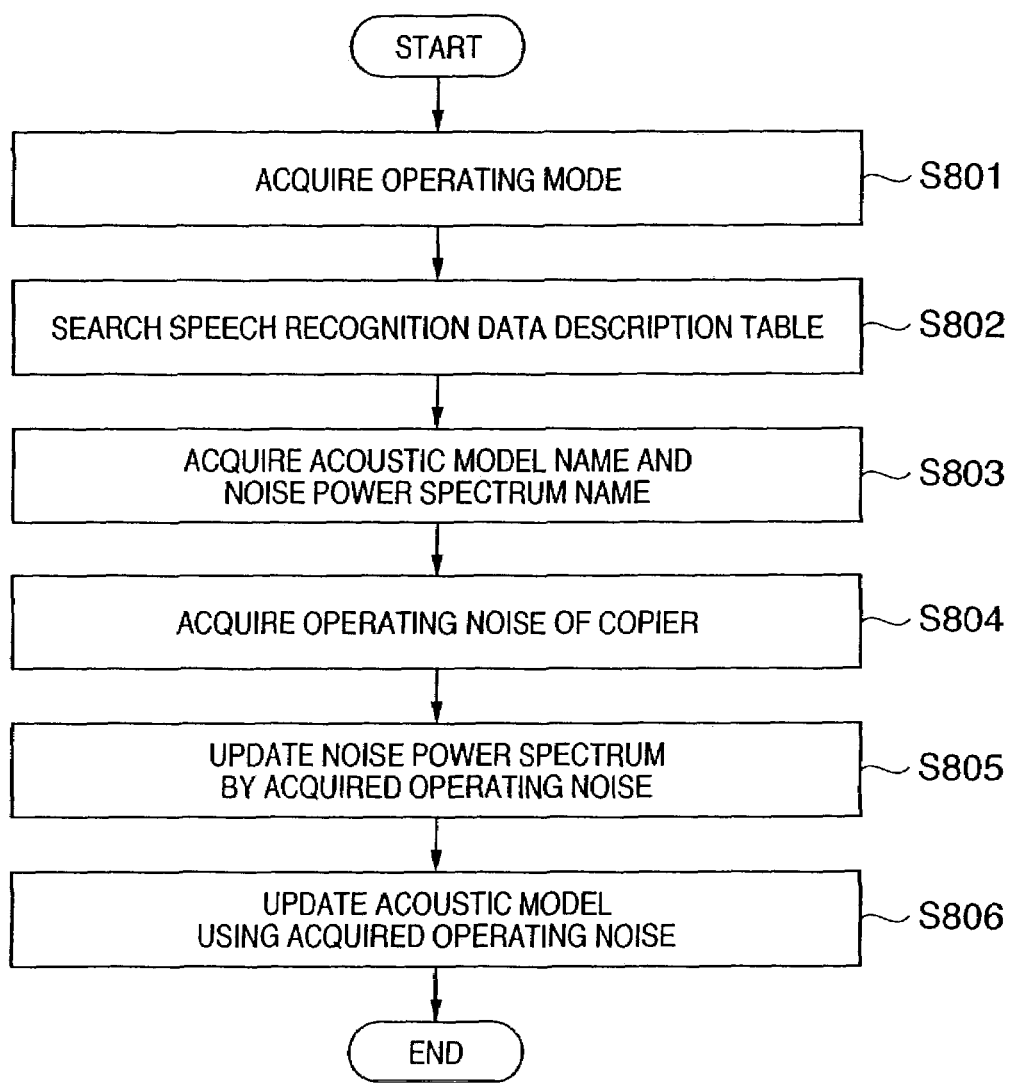
FIG. 8 is a flowchart illustrating an example noise adaptive processing in the second embodiment.

FIG. 8 is a flowchart illustrating noise adaptive processing according to the second embodiment.

In noise adaptive processing, the device operating mode detector 106 acquires the present operating mode of the copier and applies a signal representing the acquired operating mode to a data selector 711 that selects data to undergo learning (S801). The data selector 711 searches the speech recognition data description table 107, acquires the name of the noise power spectrum and the name of the acoustic model that correspond to the present operating mode of the copier and applies the name of the noise power spectrum and the name of the acoustic model that have been acquired to a data updater 712 for speech recognition data (S803).

FIG. 9 is a diagram illustrating an example of descriptions in the data description table 107 for speech recognition data in the second embodiment. For example, if the operating mode of the copier is a sorter operating mode, then acoustic model B will be acquired as the name of the acoustic model and noise power spectrum B will be acquired as the name of the noise power spectrum.

Next, the data updater 712 for speech recognition data acquires the operating sound of the copier for a prescribed period of time from the microphone 102 via an operating-sound input unit 710 in order to update the data for recognition. More specifically, the data updater 712 calculates the average power spectrum as an acoustic feature from the acquired operating sound and, using the average power spectrum calculated, updates the noise power spectrum that is to be updated (the noise power spectrum B in this example) (S805). The updater 712 further creates a noise acoustic model from the acquired operating noise, combines (by noise superposition) the acoustic model that has been created and an acoustic model 713, which has been created in a clean environment, by the parallel model combination method and, using the acoustic model obtained by the combination, updates the acoustic model to be updated (the acoustic model B in this example) (S806). It should be noted that the calculated average power spectrum of noise may be utilized to update the acoustic model by using the SS-PMC method.

Thus, in accordance with the embodiments of the invention, data for speech recognition (an acoustic model and noise power spectrum, etc.) is changed over in dependence upon the operating mode of a device, thereby making it possible to prevent a decline in speech recognition rate even when the operating noise of the device changes.

Further, in a situation where the operating noise of a device changes owing to a change with the passage of time, noise adaptive processing that updates data for speech recognition is executed at a prescribed timing, thereby making it possible to prevent a decline in speech recognition rate in conformity with a change in the operating sound of the device ascribable to a change with the passage of time.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A speech recognition apparatus comprising:
   an input section, arranged to input speech;
   a detector, arranged to detect the present operating mode of a device;
   an instructor, arranged to search a memory in which has been stored information indicating a corresponding relationship between the operating mode of the device and data for speech recognition, and to issue an instruction indicative of data for speech recognition, which has been retrieved from the memory, corresponding to the operating mode of the device;
   a recognition section, arranged to recognize the input speech using the data for speech recognition indicated by the instruction from said instructor;
   a sensor, arranged to acquire an operating sound of the device; and
   an updater, arranged to update the data for speech recognition and store the updated data in the memory, which has been indicated by the instruction from said instructor, based on the operating sound of the device,
   wherein said updater performs the update at a timing when the device is turned on, or a timing when the device has performed a prescribed operation a predetermined number of times greater than one; and
   wherein the device is not the speech recognition apparatus.

2. The apparatus according to claim 1, wherein the data for speech recognition includes a statistical quantity of an acoustic feature obtained by superimposing the operating sound of the device on an utterance from a person.

3. The apparatus according to claim 2, wherein said updater updates the statistical quantity of the acoustic feature.

4. The apparatus according to claim 1, wherein the data for speech recognition includes power information concerning the operating sound of the device.

5. The apparatus according to claim 4, wherein said recognition section detects speech intervals based upon the power information concerning the operating sound.

6. The apparatus according to claim 4, wherein said updater updates the power information concerning the operating sound.

7. The apparatus according to claim 1, wherein the data for speech recognition includes power spectrum information concerning the operating sound of the dance.

8. The apparatus according to claim 7, wherein said recognition section applies spectrum subtraction processing to the input speech using the power spectrum information concerning the operating sound.

9. The apparatus according to claim 8, wherein said updater updates the power spectrum information concerning the operating sound.

10. The apparatus according to claim 1, wherein said apparatus is mounted in a copier and the device is a copier.

11. A speech recognition method comprising the steps of:
    inputting speech;
    detecting the present operating mode of a device;
    searching a memory in which has been stored information indicating a corresponding relationship between the operating mode of the device and data for speech recognition;
    issuing an instruction indicative of data for speech recognition, which has been retrieved from the memory, corresponding to the operating mode of the device;
    recognizing the input speech using the data for speech recognition indicated by the instruction;
    acquiring an operating sound of the device; and
    updating the data for speech recognition and storing the undated data in the memory, which has been indicated byte instruction, based on the operating sound of the device,
    wherein the update is performed at a timing when the device is turned on, or a timing when the device has preformed a prescribed operation a predetermined number of times greater than one: and
    wherein the device is not a speech recognition apparatus.

12. A computer-executable program product stored in a computer-readable storage medium comprising program code for causing a computer to perform a speech recognition method, the method comprising the steps of:
    inputting speech;
    detecting the present operating mode of a device;
    searching a memory in which has been stored information indicating a corresponding relationship between the operating mode of the device and data for speech recognition;
    issuing an instruction indicative of data for speech recognition, which has been retrieved from the memory, corresponding to the operating mode of the device;
    recognizing the input speech using the data for speech recognition indicated by the instruction;
    acquiring an operating sound of the device; and
    updating the data for speech recognition and storing the updated data in the memory, which has been indicated by the instruction, based on the operating sound of the device,
    wherein the update is performed at a timing when the device is turned on, or a timing when the device has performed a prescribed operation a predetermined number of times greater than one; and
    wherein the device is not a speech recognition apparatus.

* * * * *

UNITED STATES PATENT AND TRADEMARK OFFICE
CERTIFICATE OF CORRECTION

PATENT NO. : 7,337,113 B2
APPLICATION NO. : 10/460177
DATED : February 26, 2008
INVENTOR(S) : Nakagawa et al.

Page 1 of 1

It is certified that error appears in the above-identified patent and that said Letters Patent is hereby corrected as shown below:

TITLE PAGE
At (56) FOREIGN PATENT DOCUMENTS:
"JP    7146698 A    *    6/1995" should be deleted.

IN THE DRAWINGS:
Figure 5, "OPERATION" should read --OPERATING--.

COLUMN 6:
Line 44, "in dependence" should read --depending--.

COLUMN 7:
Line 54, "one;" should read --one,--.

COLUMN 8:
Line 9, "dance." should read --device--.
Line 33, "undated" should read --updated--.
Line 34, "byte" should read --by the--.
Line 38, "preformed" should read --performed--.
Line 39, "one:" should read --one,--.
Line 64, "one;" should read --one,--.

Signed and Sealed this

Twenty-third Day of September, 2008

JON W. DUDAS
*Director of the United States Patent and Trademark Office*